(12) United States Patent
Chenoweth et al.

(10) Patent No.: US 10,934,907 B2
(45) Date of Patent: Mar. 2, 2021

(54) OUTLET FOR EXHAUST GAS AFTERTREATMENT MODULE

(71) Applicant: Caterpillar Inc., Deerfield, IL (US)

(72) Inventors: Kurtis Chenoweth, Ipava, IL (US); Jianping Pan, Dunlap, IL (US); Mohamed Daoud, Dunlap, IL (US); Ian Aguirre, Peoria, IL (US); Y. T. Bui, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 36 days.

(21) Appl. No.: 16/359,726

(22) Filed: Mar. 20, 2019

(65) Prior Publication Data

US 2020/0300137 A1 Sep. 24, 2020

(51) Int. Cl.
| | | |
|---|---|---|
| *F01N 3/00* | (2006.01) | |
| *F01N 3/10* | (2006.01) | |
| *F01N 3/28* | (2006.01) | |

(52) U.S. Cl.
CPC ............... *F01N 3/005* (2013.01); *F01N 3/10* (2013.01); *F01N 3/2885* (2013.01); *F01N 2230/04* (2013.01); *F01N 2560/02* (2013.01)

(58) Field of Classification Search
CPC ...... F01N 13/002; F01N 13/017; F01N 13/02; F01N 13/1827; F01N 13/1855; F01N 2450/02; F01N 2450/30; F01N 2610/02; F01N 3/2066; F01N 3/2892; F01N 13/001; F01N 1/02; F01N 1/083; F01N 2230/04; F01N 2470/14; F01N 2490/00; F01N 2490/02; F01N 2590/08; F01N 3/10; Y02T 10/24

See application file for complete search history.

(56) References Cited

U.S. PATENT DOCUMENTS

| | | | |
|---|---|---|---|
| 3,993,160 A | 11/1976 | Rauch | |
| 4,589,515 A | 5/1986 | Omura | |
| 5,025,890 A | 6/1991 | Hisashige et al. | |
| 5,321,215 A | 6/1994 | Kicinski | |
| 6,629,580 B2 | 10/2003 | Nilsson et al. | |
| 7,713,493 B2 | 5/2010 | Bosanec, Jr. et al. | |
| 7,878,300 B2 | 2/2011 | Sammut et al. | |
| 8,393,147 B2 * | 3/2013 | Gerges ..................... | F01N 1/02 181/237 |
| 9,976,468 B2 | 5/2018 | Tsukamoto et al. | |

(Continued)

FOREIGN PATENT DOCUMENTS

KR 20160003986 U 11/2016

*Primary Examiner* — Anthony Ayala Delgado

(57) ABSTRACT

An aftertreatment module is disclosed. The aftertreatment module may include a housing and a mounting plate within the housing that forms an inlet chamber and an outlet chamber. The aftertreatment module may include an inlet for exhaust gas from a combustion engine to flow into the inlet chamber and an outlet through a top plate of the housing for the exhaust gas to flow from the outlet chamber, wherein the outlet comprises a plurality of perforations. The aftertreatment module may include an outlet sensor mounted on the outlet to obtain information relating to the exhaust gas as the exhaust gas flows from the outlet chamber and a set of catalysts mounted to the mounting plate to treat the exhaust gas as the exhaust gas flows from the inlet chamber to the outlet chamber. The aftertreatment module may include a drain port through a side plate of the housing.

20 Claims, 5 Drawing Sheets

(56) References Cited

U.S. PATENT DOCUMENTS

| | | |
|---|---|---|
| 2008/0023264 A1 | 1/2008 | Pacini et al. |
| 2009/0078499 A1 | 3/2009 | Sikes et al. |
| 2013/0074817 A1* | 3/2013 | Fisher ................ F02D 41/1463 123/674 |
| 2017/0370270 A1 | 12/2017 | Endo et al. |
| 2019/0331016 A1* | 10/2019 | Morey ................ F01N 13/017 |

* cited by examiner

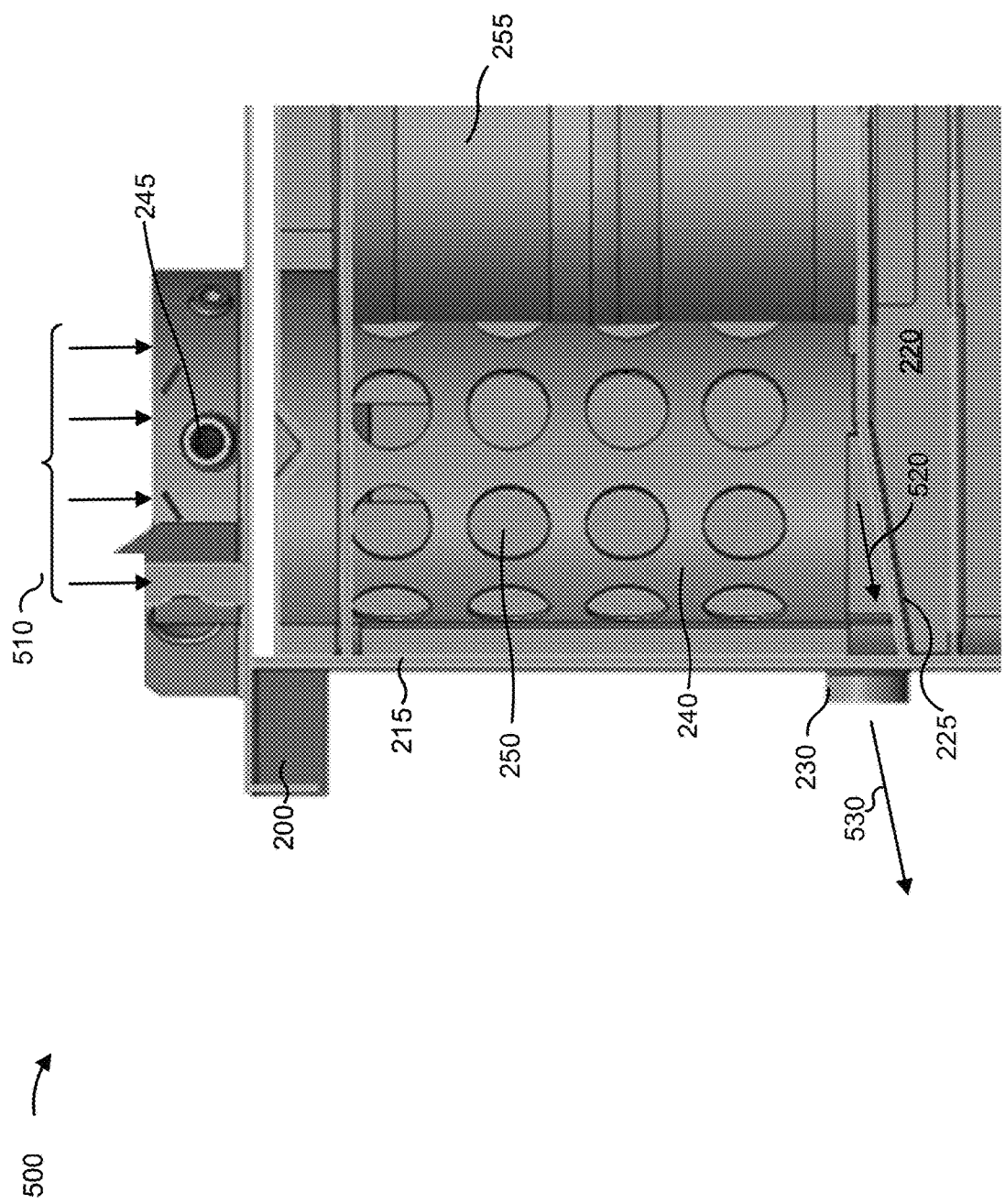

OUTLET FOR EXHAUST GAS AFTERTREATMENT MODULE

TECHNICAL FIELD

The present disclosure relates generally to an outlet and, more particularly, to an outlet for an exhaust gas aftertreatment module.

BACKGROUND

An aftertreatment system treats exhaust gas from an engine before the exhaust gas flows into the atmosphere. For example, an aftertreatment module of an aftertreatment system may include a set of catalysts to process the exhaust gas and to convert toxic gases present in the exhaust gas into less toxic or non-toxic gases by catalyzing the exhaust gas. The exhaust gas flows from the engine, through the set of catalysts of the aftertreatment system, and exits through an outlet of the aftertreatment system. An outlet sensor obtains information relating to the exhaust gas (e.g., an amount of nitrogen oxide in the exhaust gas, a temperature of the exhaust gas, a pressure of the exhaust gas, and/or the like) as the exhaust gas exits the outlet.

In some cases, due to a location of the outlet sensor and/or respective paths of individual flows of exhaust gas from individual catalysts of the set of catalysts, the outlet sensor may not obtain complete information about the exhaust gas as the exhaust gas exits the outlet. For example, the outlet sensor may obtain information about exhaust gas that flows from only some (but not all) of the catalysts, if the individual flows are only partially combined or mixed. Further, in some cases, the flow of the exhaust gas through the outlet may create noise. Additionally, in some cases, water, such as rainwater, may enter the aftertreatment system (e.g., via the outlet) and may flow into the engine, which may cause hydrolocking of the engine.

One attempt at a combination exhaust muffler and aftertreatment element and water trap assembly is disclosed in U.S. Pat. No. 7,713,493 that issued on May 11, 2010 ("the '493 patent"). In particular, the '493 patent discloses an exhaust water trap assembly that includes: a housing that has a lower inlet for receiving exhaust from an internal combustion engine through a catalytic converter or soot filter, and an upper outlet for discharging the exhaust; an internal exhaust tube that extends upwardly from the lower inlet; and a dome cap or umbrella on a top end of the internal exhaust tube that spans the internal exhaust tube and blocks exhaust flow axially upwardly therepast, and blocks entry of water axially downwardly therepast into the top end of the internal exhaust tube from the upper outlet and instead diverts and sheds water radially outwardly into annular space. Per the '493 patent, the internal exhaust tube is perforated and exhaust flows through the lower inlet into an interior of the internal exhaust tube and then flows radially outwardly through the perforations into the annular space, past the dome cap, and then to the upper outlet for discharge. According to the '493 patent, the exhaust water trap assembly also includes a collection space for water shed from the dome cap into the annular space and one or more drain holes for draining water from the collection space.

While the '493 patent may provide an exhaust water trap assembly, where exhaust gas flows from an internal exhaust tube to an upper outlet for discharge and where water is diverted into an annular space and output by one or more drain holes, the '493 patent does not disclose an aftertreatment module that is able to perform these functions without a cap, an umbrella, and/or the like.

The exhaust gas aftertreatment system of the present disclosure solves one or more problems faced by the aftertreatment element of the '493 patent and/or other problems in the art.

SUMMARY

According to some implementations, the present disclosure is related to an aftertreatment module comprising: a housing; a mounting plate within the housing that forms an inlet chamber on a bottom side of the mounting plate and an outlet chamber on a top side of the mounting plate; an inlet through a bottom plate of the housing for exhaust gas from a combustion engine to flow into the inlet chamber; an outlet through a top plate of the housing for the exhaust gas to flow from the outlet chamber, wherein the outlet comprises a plurality of perforations; an outlet sensor mounted on the outlet to obtain information relating to the exhaust gas as the exhaust gas flows from the outlet chamber; a set of catalysts mounted to the mounting plate to treat the exhaust gas as the exhaust gas flows from the inlet chamber to the outlet chamber; and a drain port through a side plate of the housing.

According to some implementations, the present disclosure is related to a machine comprising: a combustion engine; an inlet module; and an aftertreatment module connected to the combustion engine via the inlet module, the aftertreatment module comprising: a housing; a mounting plate within the housing that forms an inlet chamber on a bottom side of the mounting plate and an outlet chamber on a top side of the mounting plate, wherein exhaust gas from the combustion engine is to flow into the inlet chamber via the inlet module, and wherein the exhaust gas is to flow into the outlet chamber from the inlet chamber via a set of catalysts, an outlet through a top plate of the housing, wherein the outlet comprises a plurality of perforations, wherein the exhaust gas is to flow from the outlet chamber via the outlet; and a drain port through a side plate of the housing, wherein water is to flow from the outlet chamber via the drain port.

According to some implementations, the present disclosure is related to an exhaust gas aftertreatment system comprising: an inlet module mechanically connected to a combustion engine of a machine to receive exhaust gas from the combustion engine; and an aftertreatment module mechanically connected to the inlet module to receive the exhaust gas from the inlet module, the aftertreatment module comprising: a housing; a mounting plate within the housing that forms an inlet chamber on a bottom side of the mounting plate and an outlet chamber on a top side of the mounting plate, wherein the top side of the mounting plate includes an angled surface, wherein the inlet chamber is to receive a flow of the exhaust gas from the inlet module, and wherein the outlet chamber is to receive the flow of the exhaust gas via a set of catalysts and a flow of water via an outlet; the outlet through a top plate of the housing, wherein the outlet comprises a plurality of perforations, wherein the outlet is to facilitate the flow of the exhaust gas from the outlet chamber, and wherein the outlet is to facilitate the flow of the water to the outlet chamber; and an outlet sensor mounted on the outlet to obtain information relating to the exhaust gas as the exhaust gas flows from the outlet chamber.

BRIEF DESCRIPTION OF THE DRAWINGS

FIG. 5 is a diagram of an example flow pattern of water through an example aftertreatment module described herein.

DETAILED DESCRIPTION

This disclosure relates to an exhaust gas aftertreatment module. The exhaust gas aftertreatment module has universal applicability to any machine that produces exhaust gases. The term "machine" may refer to any machine that performs an operation associated with an industry such as, for example, mining, construction, farming, transportation, or any other industry. As some examples, the machine may be a vehicle (e.g., a locomotive), a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment. Moreover, one or more implements may be connected to the machine and driven from an engine connected to the exhaust gas aftertreatment module.

Figure 1:
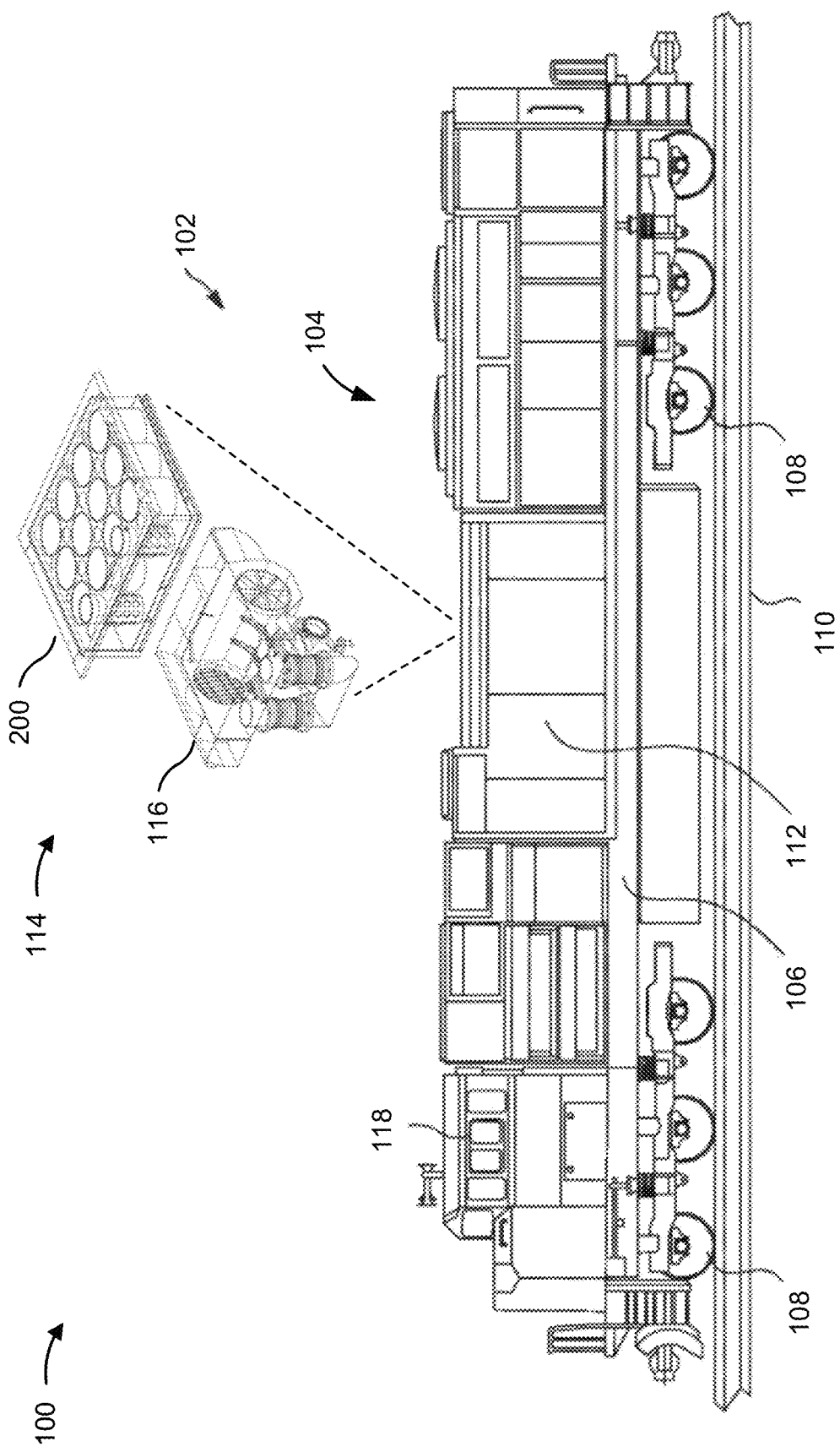
FIG. 1 is a diagram of an example machine that includes an aftertreatment module described herein.

FIG. 1 is a diagram 100 of an example machine that includes an exhaust gas aftertreatment module described herein. Diagram 100 shows an example machine 102. The machine 102 will be described as a locomotive 104. However, the machine 102 may be any other machine requiring exhaust gas aftertreatment.

The locomotive 104 may include a frame 106. The frame 106 may support one or more components of the locomotive 104. The locomotive 104 may include a set of wheels 108 mounted to the frame 106. The wheels 108 may support and provide mobility to the locomotive 104 on a set of rails 110. The locomotive 104 may include an enclosure 112 mounted on the frame 106. The enclosure 112 may house one or more components (not shown) provided on the frame 106 of the locomotive 104.

The locomotive 104 may include an engine system (not shown) provided on the frame 106 and within the enclosure 112. The engine system may include an engine that is an internal combustion engine or a gas turbine engine. The engine may be powered by a fuel such as diesel, gasoline, natural gas, and/or the like, or a combination thereof. The engine may generate mechanical power for the locomotive 104. The engine may include an intake manifold that receives intake air through an air intake system of the engine. The engine may include an exhaust manifold that expels products of combustion, such as exhaust gas, from the engine.

The locomotive 104 may include an exhaust gas aftertreatment system 114 provided on the frame 106 of the machine 102. The exhaust gas aftertreatment system 114 may be coupled to the engine. The exhaust gas aftertreatment system 114 may receive exhaust gases generated by the engine (e.g., via the exhaust manifold). The exhaust gas aftertreatment system 114 may treat the exhaust gases before releasing the exhaust gases into the atmosphere. The exhaust gas aftertreatment system 114 may include a number of components (not shown) such as a Diesel Oxidation Catalyst (DOC), a Diesel Particulate Filter (DPF), a reductant injection system, a mixer, a Selective Catalytic Reduction (SCR) unit, and/or the like based on a design of the exhaust gas aftertreatment system 114. Specifically, the exhaust gas aftertreatment system 114 may include an inlet module 116, an aftertreatment module 200 (described with respect to FIG. 2), and/or the like described herein.

The locomotive 104 may include an operator cabin 118 provided on the frame 106. The operator cabin 118 may house various controls of the locomotive 104 that may be configured to operate and/or control the locomotive 104.

As indicated above, FIG. 1 is provided as an example. Other examples may differ from what is described in connection with FIG. 1.

Figure 2:
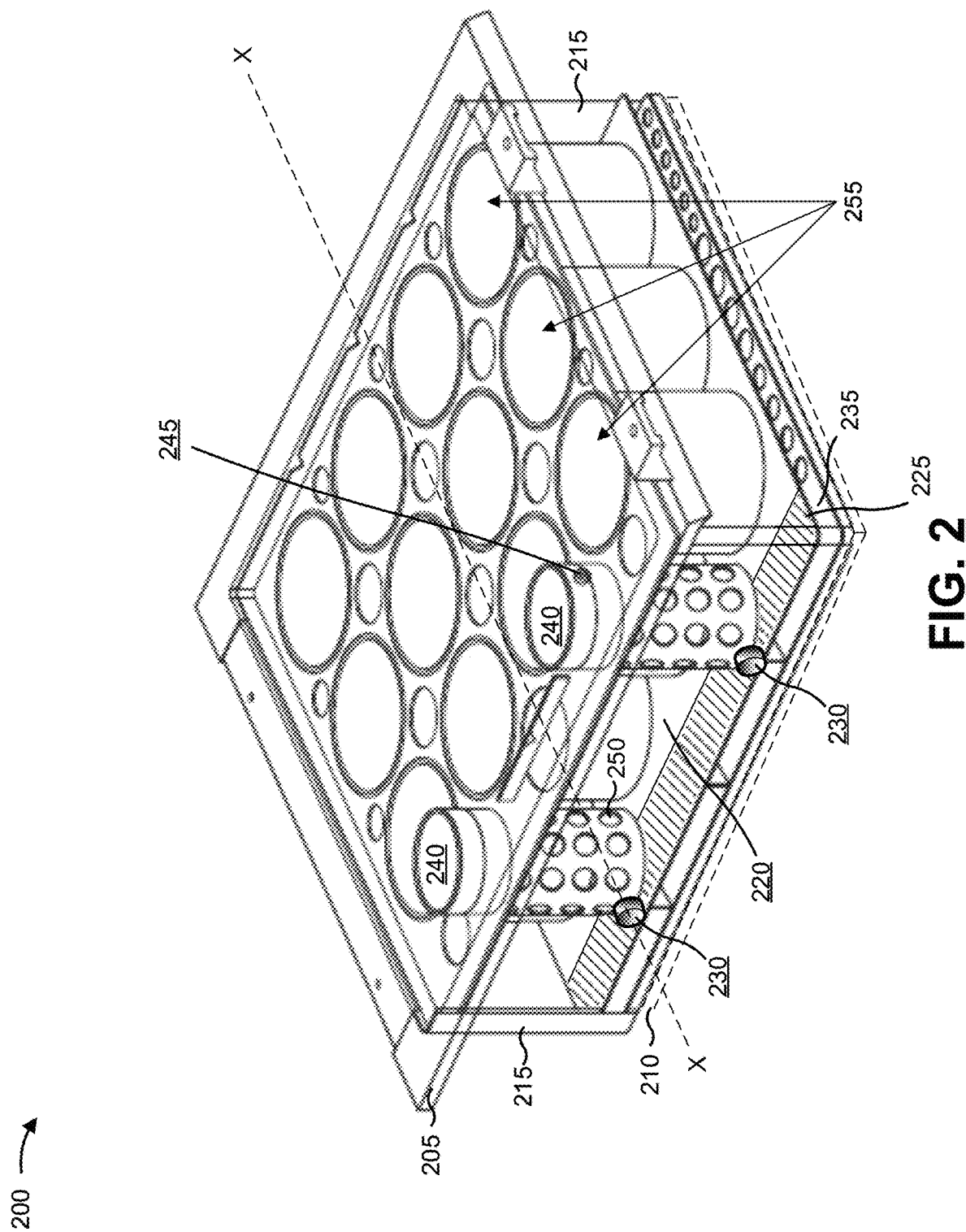
FIG. 2 is a diagram of an example aftertreatment module that may be used with the machine of FIG. 1.

FIG. 2 is a diagram of an example aftertreatment module 200 that may be used with the machine of FIG. 1. FIG. 2 shows both internal and external components of the aftertreatment module 200.

As shown in FIG. 2, the aftertreatment module 200 may include a top plate 205, a bottom plate 210, and various side plates 215. The top plate 205, the bottom plate 210, and the various side plates 215 may form a housing of the aftertreatment module 200. The housing may be generally airtight, except for inlets and outlets described herein, so as to contain exhaust gas from an engine of the locomotive 104. The bottom plate 210 and/or the various side plates 215 may be plates of other components of the locomotive 104 (e.g., of the inlet module 116, of the enclosure 112, and/or the like). For example, the bottom plate 210 may be a top plate of inlet module 116.

As further shown in FIG. 2, the aftertreatment module 200 may include a mounting plate 220 within the housing of the aftertreatment module 200. For example, the mounting plate 220 may form generally airtight seals with the various side plates 215, and may divide an interior of the housing into two chambers (e.g., an inlet chamber and an outlet chamber), described elsewhere herein. One or more other components of the aftertreatment module 200 may be mounted to the mounting plate 220, as described elsewhere herein. As additionally shown in FIG. 2, the mounting plate 220 may include an angled surface 225 (e.g., shown in FIG. 2 as a textured area of the mounting plate 220). The angled surface 225 may be on a top side of the mounting plate 220. The angled surface 225 may have an angle within a range of 1 to 45 degrees. The angled surface 225 may slope toward one or more drain ports 230. In this case, the one or more drain ports 230 includes two drain ports 230; however, other quantities of outlets may be used. A drain port 230 may be a pipe, a tube, an opening, and/or the like and may be installed through one or more of the various side plates 215. The angled surface 225 and/or the one or more drain ports 230 may facilitate removal of water (resulting from, e.g., rain, snow, hail, ice, cleaning water used to clean the locomotive 104, and/or the like) from the aftertreatment module as described herein. Flow of water through the aftertreatment module 200 is described in more detail below. While water is used as an example, any other liquids entering the aftertreatment module also may be drained via drain ports 230.

As further shown in FIG. 2, the aftertreatment module 200 may include a diffuser plate 235 (e.g., between the bottom plate 210 and the mounting plate 220). For example, the diffuser plate 235 may be mechanically connected to the various side plates 215 within an inlet chamber formed between the bottom plate 210 and the mounting plate 220 and may divide the inlet chamber into an upper portion and a lower portion, as described elsewhere herein. The diffuser plate 235 may include a plurality of holes via which exhaust gas may flow from the lower portion of the inlet chamber to the upper portion of the inlet chamber after diffusing across the diffuser plate 235.

As further shown in FIG. 2, the aftertreatment module 200 may include one or more outlets 240. In this case, the one or more outlets 240 includes two outlets 240, but other quantities of outlets may be used. An outlet 240 may be a pipe (e.g., a tailpipe, as shown in FIG. 2), an opening, and/or the like through the top plate 205 of the housing of the aftertreatment module 200. An outlet 240 may include a plurality of perforations 250, such as when the outlet 240 is a pipe or other structure installed through the top plate 205. The plurality of perforations 250 may facilitate outflow of the exhaust gas from the outlet chamber of the aftertreatment module 200. For example, when debris (e.g., dirt buildup, a bird's nest, and/or the like) blocks some of the perforations of the plurality of perforations 250, exhaust gas may still flow into outlet 240 via other perforations of the plurality of perforations 250 that are not blocked by the debris.

Additionally, or alternatively, the plurality of perforations 250 may facilitate sound attenuation during outflow of exhaust gas from the aftertreatment module 200. For example, exhaust gas may flow into an outlet 240 from the outlet chamber via a plurality of perforations 250, which changes an area of flow associated with the exhaust gas (e.g., the exhaust gas flows through a smaller cross section area through perforations 250). This change in area of flow may attenuate noise associated with the flow of the exhaust gas. As another example, a flow of the exhaust gas into the outlet 240 via the plurality of perforations 250 may cause destructive interference of sound waves associated with the exhaust gas (e.g., some sound waves produced by the exhaust gas flowing through the plurality of perforations 250 may destructively interfere with other sound waves produced by the exhaust gas flowing through the plurality of perforations 250).

Additionally, or alternatively, the plurality of perforations 250 may promote mixing of the exhaust gas as the exhaust gas flows from the outlet chamber. For example, the exhaust gas may flow into an outlet 240 from the outlet chamber via a plurality of perforations 250, which changes an area of flow associated with the exhaust gas and thereby may change a velocity of the exhaust gas as the exhaust gas flows into the outlet 240 (e.g., increase a velocity of the flow of the exhaust gas as the exhaust gas flows from the outlet chamber). The exhaust gas may enter the outlet 240 via the plurality of perforations at an increased velocity and from different directions, which may promote a flow of the exhaust around an inside surface of the outlet 240. This may facilitate mixing of the exhaust gas.

As further shown in FIG. 2, the aftertreatment module 200 may include one or more outlet sensors 245. An outlet sensor 245 may be mounted on, integrated into, attached to, and/or affixed to an outlet 240. An outlet sensor 245 may detect an amount of nitrogen oxide (e.g., a concentration percentage of nitrogen oxide) in the exhaust gas, a temperature of the exhaust gas, a pressure associated with the exhaust gas (e.g., a pressure caused by the exhaust gas flowing through outlet 240, a backpressure caused by the exhaust gas flowing through outlet 240, and/or the like), and/or the like as the exhaust gas exits the aftertreatment module 200. An outlet sensor 245 may send information relating to the amount of nitrogen oxide in the exhaust gas, the temperature of the exhaust gas, the pressure associated with the exhaust gas, and/or the like as the exhaust gas exits the aftertreatment module 200 to a controller (not shown) associated with the engine of the locomotive 104 to affect operation of the engine (e.g., cause the engine to operate in a manner that affects the amount of nitrogen oxide in the exhaust gas, the temperature of the exhaust gas, the pressure associated with the exhaust gas, and/or the like) and/or the exhaust gas aftertreatment system 114 (e.g., cause a change in an amount of reductant (e.g., a diesel exhaust fluid (DEF)) injected by a reductant injector in the inlet module 116).

As further shown in FIG. 2, the aftertreatment module 200 may include a set of catalysts 255. For example, a catalyst 255 may include a set of catalytic converters, a set of catalyst cylinders, a set of filters, and/or the like associated with processing and/or treating exhaust gas from an engine of the locomotive 104 to convert and/or remove toxic gases in the exhaust gas. The set of catalysts 255 may be mounted to the mounting plate 220. For example, the set of catalysts 255 may be mounted to the mounting plate 220 such that the set of catalysts 255 extend through the mounting plate 220 and such that respective bottom openings of the set of catalysts 255 are beneath the mounting plate 220 (e.g., in an upper portion of the inlet chamber) and such that respective top openings of the set of catalysts 255 are above the mounting plate 220 in the outlet chamber. This facilitates flow of exhaust gas from the upper portion of the inlet chamber to the outlet chamber via the set of catalysts 255, as described elsewhere herein.

One or more of the components of the aftertreatment module 200 described herein may comprise metal, plastic, carbon alloy, and/or the like depending on a use of the aftertreatment module 200, temperatures and/or stresses the aftertreatment module 200 is expected to experience during an operating life of the aftertreatment module 200, and/or the like. Axis X-X shown in FIG. 2 is an axis along which a cross-sectional view of the aftertreatment module 200 will be shown below in FIGS. 3 and 4.

As indicated above, FIG. 2 is provided as an example. Other examples may differ from what is described in connection with FIG. 2.

Figure 3:
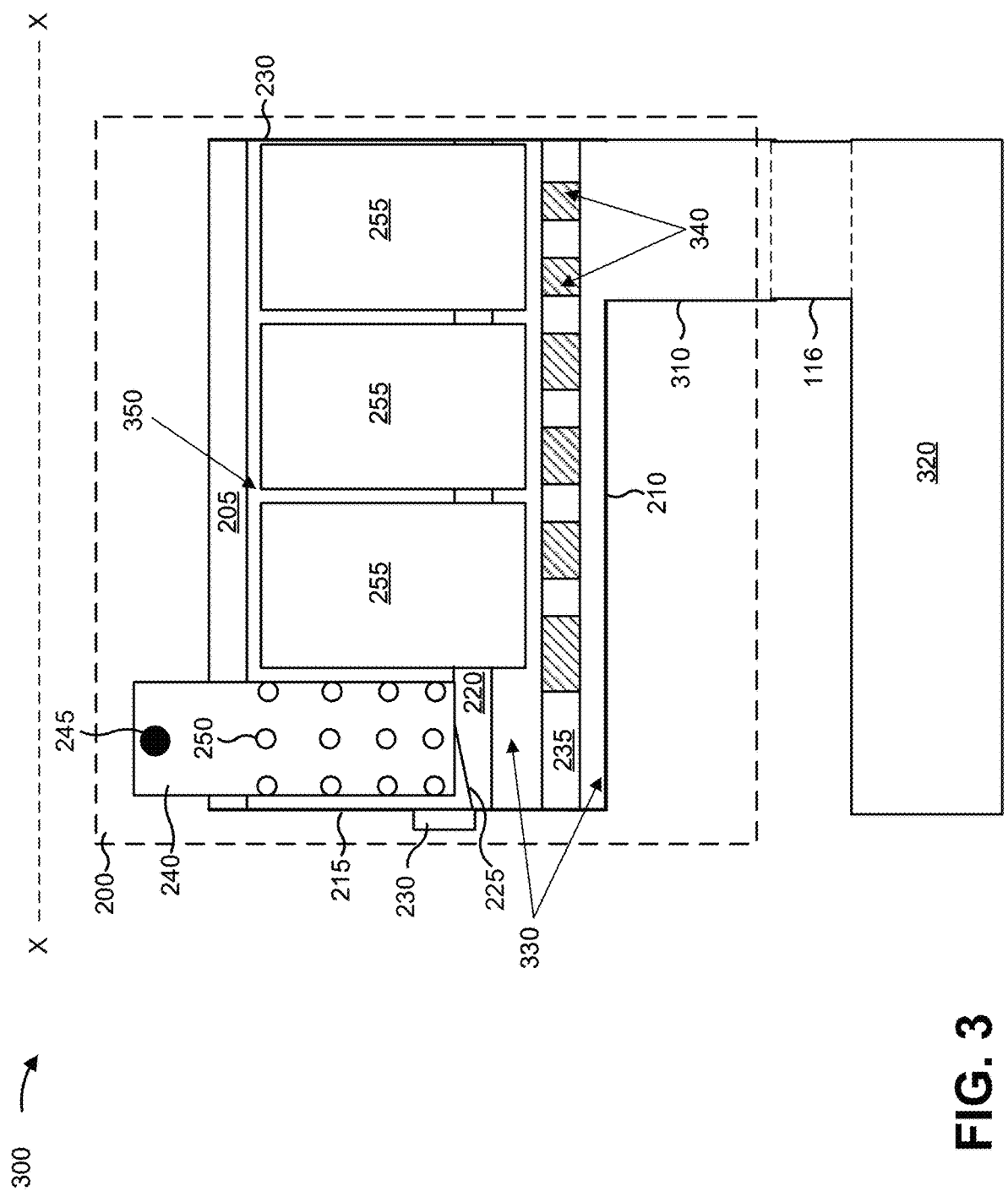
FIG. 3 is a diagram of an example aftertreatment system of the machine of FIG. 1 that includes an aftertreatment module described herein.

FIG. 3 is a diagram 300 of an example aftertreatment system of the machine of FIG. 1 that includes an aftertreatment module 200 described herein. FIG. 3 shows an example exhaust gas aftertreatment system (e.g., exhaust gas aftertreatment system 114) that includes an aftertreatment module 200, an inlet module 116, and an engine 320. FIG. 3 shows a cross section of the housing of the aftertreatment module 200 along axis X-X. As such, FIG. 3 shows a cross section of a top plate 205, a bottom plate 210, various side plates 215, a mounting plate 220, a diffuser plate 235, and an inlet 310. Based on the positioning of axis X-X shown in FIG. 2, drain port 230, outlet 240, and the set of catalysts 255 are shown, but not from a cross-sectional perspective. In addition, the inlet module 116 and engine 320 are represented using rectangular shapes and are not necessarily shown as cross-sections.

As shown in FIG. 3, the aftertreatment module 200 may include the inlet 310. The inlet 310 may provide an inlet to the aftertreatment module 200 for exhaust gas. For example, the inlet 310 may provide an inlet into a bottom portion of an inlet chamber of the aftertreatment module 200 from the inlet module 116, as described elsewhere herein. The inlet 310 may be a pipe, an opening, and/or the like through the bottom plate 210 of the aftertreatment module 200.

The inlet 310 may mechanically connect the aftertreatment module 200 to the inlet module 116. For example, the inlet module 116 may include an inlet pipe to receive the exhaust gas from the engine 320, a mixing tube connected to the inlet pipe to mix the exhaust gas with a reductant from a reductant injector, a flow diverter connected to the mixing tube to modify a flow direction of the exhaust gas, and a first outlet from the flow diverter to provide the exhaust gas to the aftertreatment module 200. As further shown in FIG. 3, the inlet module 116 may be mechanically connected to the engine 320. For example, the inlet module 116 may receive the exhaust gas from the engine 320 and may provide the exhaust gas to the aftertreatment module 200 via the inlet 310.

Reference number 330 shows an inlet chamber of the aftertreatment module 200, and specifically an upper portion of the inlet chamber (e.g., above the diffuser plate 235) and a lower portion of the inlet chamber (e.g., below the diffuser plate 235), as described elsewhere herein. Diffuser plate 235 may include one or more holes 340 to facilitate diffusion of the exhaust gas from a lower portion of the inlet chamber to an upper portion of the inlet chamber as the exhaust gas flows from the inlet 310 to the set of catalysts 255.

Reference number 350 shows an outlet chamber within a housing of the aftertreatment module 200. For example, the outlet chamber may be between the top plate 205 and the mounting plate 220. As further shown in FIG. 3, the set of catalysts 255 may be mounted to the mounting plate 220 such that a respective bottom opening of the set of catalysts 255 are in the upper portion of the inlet chamber (shown in association with reference number 330), and a respective top opening of the set of catalysts 255 are in the outlet chamber (shown in association with reference number 350). This facilitates pass through of the exhaust gas from the upper portion of the inlet chamber to the outlet chamber via the set of catalysts 255, thereby facilitating interaction of the exhaust gas with the set of catalysts 255 as the exhaust gas flows from the inlet chamber to the outlet chamber. The flow of exhaust gas through the aftertreatment module 200 is described in more detail below.

As indicated above, FIG. 3 is provided as an example. Other examples may differ from what is described in connection with FIG. 3.

Figure 4:
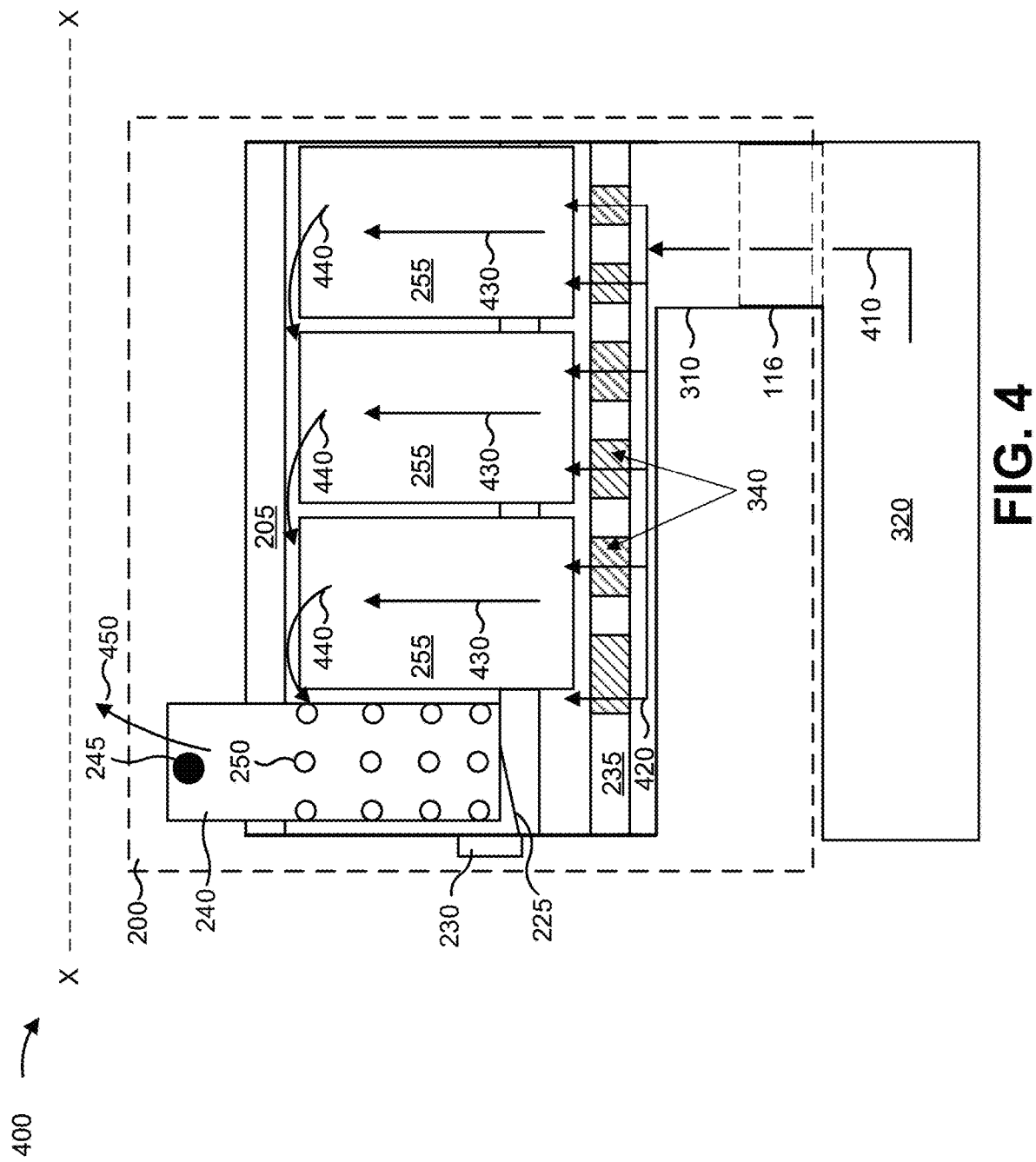
FIG. 4 is a diagram of an example flow pattern of exhaust gas through the aftertreatment system of FIG. 3.

FIG. 4 is a diagram 400 of an example flow pattern of exhaust gas through the aftertreatment system 114 of FIG. 3. For example, FIG. 4 shows various flow paths via which exhaust gas may flow through the exhaust gas aftertreatment system 114.

As shown by reference number 410, the exhaust gas may flow from the engine 320 into the inlet module 116. The exhaust gas may flow through various components of the inlet module 116, and the various components may perform various operations on the exhaust gas as described elsewhere herein. The exhaust gas may exit the inlet module 116 and may flow into the inlet 310 of the aftertreatment module 200. As shown by reference number 420, after flowing into the inlet 310, the exhaust gas may flow into a lower portion of an inlet chamber of the aftertreatment module 200 and may diffuse across the diffuser plate 235. The exhaust gas may flow through holes 340 as the gas diffuses across the diffuser plate 235. The exhaust gas may flow into the upper portion of the inlet chamber after flowing through the holes 340.

As shown by reference numbers 430, the exhaust gas may flow from the upper portion of the inlet chamber through the set of catalysts 255. For example, the exhaust gas may flow into the set of catalysts 255 via a respective bottom opening of the set of catalysts 255 and may flow vertically through the set of catalysts 255. While flowing through the set of catalysts 255, the exhaust gas may undergo conversion and/or the like by the set of catalysts 255. As shown by reference numbers 440, the exhaust gas may flow through a respective top opening of the set of catalysts 255 into the outlet chamber. In the outlet chamber, the gas may flow into outlet 240 via the perforations 250. As shown by reference number 450, the exhaust gas may flow out of the aftertreatment module 200 via the outlet 240 and into the atmosphere.

As indicated above, FIG. 4 is provided as an example. Other examples may differ from what is described in connection with FIG. 4.

FIG. 5 is a diagram 400 of an example flow pattern of water through an example aftertreatment module 200 described herein. For example, FIG. 5 shows flow paths via which water (and/or other liquids) may flow through the aftertreatment module 200.

As shown by reference number 510, the water (resulting from, e.g., rainwater, snow, hail, ice, cleaning water used to clean the locomotive 104, and/or the like) may flow into the outlet 240 from the atmosphere. The water may flow through the outlet 240 into the outlet chamber, and may collect on the mounting plate 220 that forms a bottom side of the outlet chamber. The mounting plate 220 may include an angled surface 225 on the top side of the mounting plate 220. The angled surface 225 may have an angle (e.g., 30 degrees) that causes the water to flow across the top side of the mounting plate 220 to the angled surface 225. The angled surface 225 may slope toward the drain port 230. As shown by reference number 520, the water may flow across the angled surface 225 to the drain port 230. As shown by reference number 530, the water may flow through the drain port 230 to outside the aftertreatment module 200 (e.g., into the atmosphere, into a tube, pipe, and/or the like that transports the water below the locomotive 104 by the rails 110, and/or the like).

As indicated above, FIG. 5 is provided as an example. Other examples may differ from what is described in connection with FIG. 5.

INDUSTRIAL APPLICABILITY

The disclosed aftertreatment module 200 may be used with any machine where such an aftertreatment module is needed. The aftertreatment module may be configured with one or more outlets through a top plate of a housing of the aftertreatment module to facilitate outflow of exhaust gas from an outlet chamber of the aftertreatment module. An outlet may comprise a plurality of perforations that facilitate attenuating noise associated with the exhaust gas flowing through and/or exiting the outlet (e.g., the exhaust gas flowing through the perforations causes the exhaust gas to flow through a smaller cross section area and/or causes destructive interference of sounds waves associated with the exhaust gas flowing through the perforations).

Moreover, the aftertreatment module may be configured with one or more outlet sensors. An outlet sensor may be mechanically connected to an outlet and may obtain information relating to the exhaust gas (e.g., an amount of nitrogen oxide in the exhaust gas, a temperature of the exhaust gas, a pressure of the exhaust gas, and/or the like) as the exhaust gas flows through and/or exits the outlet. The plurality of perforations of the outlet may promote mixing of the exhaust gas as the exhaust gas flows through and/or exits the outlet to enable the outlet sensor to obtain accurate information relating to the exhaust gas (e.g., information that is reflective of the composition, temperature, pressure, and/or the like of all of the exhaust gas that flows through and/or exits the outlet, not just some of the exhaust gas). For example, the perforations may cause a velocity and/or direction of the exhaust gas to change as the exhaust gas enters the outlet, which may cause the exhaust gas to flow and mix around an inside surface of the outlet before exiting the outlet.

Moreover, the aftertreatment module may be configured with one or more drain ports for outputting water (resulting from, e.g., rainwater, snow, hail, ice, cleaning water, and/or the like) that enters the one or more outlets. The aftertreatment module may also be configured with a mounting plate that has an angled surface to facilitate the water flowing to the drain ports and outputting from the aftertreatment module. The aftertreatment module may also be configured such that the drain ports and the mounting plate are located on a bottom portion of an outlet chamber of the aftertreatment module (e.g., opposite an upper portion of the outlet chamber where openings for catalysts for treating the exhaust gas are located) so that the water does not flow to an engine associated with the aftertreatment module via the catalysts. This prevents hydrolocking of the engine.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. An aftertreatment module, comprising:
   a housing;
   a mounting plate within the housing that forms an inlet chamber on a bottom side of the mounting plate and an outlet chamber on a top side of the mounting plate;
   an inlet through a bottom plate of the housing for exhaust gas from a combustion engine to flow into the inlet chamber;
   an outlet through a top plate of the housing for the exhaust gas to flow from the outlet chamber,
   wherein the outlet comprises a plurality of perforations, the plurality of perforations being provided in a portion of the outlet in the outlet chamber;
   an outlet sensor mounted on the outlet to obtain information relating to the exhaust gas as the exhaust gas flows from the outlet chamber;
   a set of catalysts mounted to the mounting plate to treat the exhaust gas as the exhaust gas flows from the inlet chamber to the outlet chamber, respective outlets of the catalysts being in the outlet chamber; and
   a drain port through a plate of the housing.

2. The aftertreatment module of claim 1, wherein the plurality of perforations of the outlet are to facilitate flow of the exhaust gas from the outlet chamber.

3. The aftertreatment module of claim 1, wherein the plurality of perforations of the outlet are to promote mixing of the exhaust gas as the exhaust gas flows from the outlet chamber.

4. The aftertreatment module of claim 1, wherein the outlet is to cause destructive interference of sound waves associated with the exhaust gas as the exhaust gas flows from the outlet chamber.

5. The aftertreatment module of claim 1, wherein the top side of the mounting plate includes an angled surface to facilitate flow of rainwater in the outlet chamber to the drain port.

6. The aftertreatment module of claim 1, wherein the outlet sensor is to:
   obtain information relating to an amount of nitrogen oxide in the exhaust gas, a temperature of the exhaust gas, or a pressure associated with the exhaust gas; and
   cause a modification in operation of the combustion engine based on the information.

7. The aftertreatment module of claim 1, wherein at least one of the outlets of the catalysts leads directly to the portion of the outlet having the plurality of perforations.

8. A machine, comprising:
   a combustion engine;
   an inlet module; and
   an aftertreatment module connected to the combustion engine via the inlet module, the aftertreatment module comprising:
   a housing;
   a mounting plate within the housing that forms an inlet chamber on a bottom side of the mounting plate and an outlet chamber on a top side of the mounting plate,
      wherein exhaust gas from the combustion engine is to flow into the inlet chamber via the inlet module, and
      wherein the exhaust gas is to flow into the outlet chamber from the inlet chamber via a set of catalysts, respective outlets of the catalysts being in the outlet chamber,
   an outlet through a top plate of the housing,
      wherein the outlet comprises a plurality of perforations, the plurality of perforations being provided in a portion of the outlet in the outlet chamber,
      wherein the exhaust gas is to flow from the outlet chamber via the outlet; and
   a drain port through a side plate of the housing,
      wherein water is to flow from the outlet chamber via the drain port.

9. The machine of claim 8, wherein the outlet is to change a velocity of the exhaust gas as the exhaust gas flows from the outlet chamber to promote a flow of the exhaust gas around an inside surface of the outlet.

10. The machine of claim 8, wherein the outlet is to attenuate noise associated with the exhaust gas flowing from the outlet chamber.

11. The machine of claim 8, wherein the outlets of the catalysts lead treated exhaust gas directly horizontally to the portion of the outlet having the plurality of perforations.

12. The machine of claim 8, wherein the aftertreatment module is to cause water to flow:
   into the outlet chamber via the outlet,
   across the top side of the mounting plate to an angled surface of the top side of the mounting plate;
   from the angled surface of the top side of the mounting plate to the drain port; and
   through the drain port to be output from the aftertreatment module.

13. The machine of claim 8, wherein the top side of the mounting plate includes an angled surface to facilitate flow of the water to the drain port.

14. The machine of claim 13, wherein an angle associated with the angled surface of the mounting plate is within a range of 1 to 45 degrees.

15. An exhaust gas aftertreatment system, comprising:
an inlet module mechanically connected to a combustion engine of a machine to receive exhaust gas from the combustion engine; and
an aftertreatment module mechanically connected to the inlet module to receive the exhaust gas from the inlet module, the aftertreatment module comprising:
a housing;
a mounting plate within the housing that forms an inlet chamber on a bottom side of the mounting plate and an outlet chamber on a top side of the mounting plate,
wherein the top side of the mounting plate includes an angled surface,
wherein the inlet chamber is to receive a flow of the exhaust gas from the inlet module, and
wherein the outlet chamber is to receive the flow of the exhaust gas via a set of catalysts and a flow of water via an outlet, respective outlets of the catalysts being in the outlet chamber;
the outlet through a top plate of the housing,
wherein the outlet comprises a plurality of perforations, the plurality of perforations being provided in a portion of the outlet in the outlet chamber,
wherein the outlet is to facilitate the flow of the exhaust gas from the outlet chamber, and
wherein the outlet is to facilitate the flow of the water to the outlet chamber; and
an outlet sensor mounted on the outlet to obtain information relating to the exhaust gas as the exhaust gas flows from the outlet chamber.

16. The exhaust gas aftertreatment system of claim 15, wherein the aftertreatment module is to cause the exhaust gas to flow:
from the combustion engine into the inlet module,
from the inlet module into the inlet chamber,
from the inlet chamber into the outlet chamber via the set of catalysts,
from the outlet chamber into the outlet via the plurality of perforations of the outlet, and
from the outlet to outside the aftertreatment module, and
wherein the outlet extends vertically to between a midway point in a height of the set of catalysts and a bottom of the set of catalysts.

17. The exhaust gas aftertreatment system of claim 15, wherein the outlet is to increase a velocity of the flow of the exhaust gas as the exhaust gas flows from the outlet chamber.

18. The exhaust gas aftertreatment system of claim 15,
wherein the outlet is to receive the flow of the exhaust from the outlet chamber via the plurality of perforations of the outlet,
wherein the outlet is to facilitate mixing of the exhaust gas as the exhaust gas flows through the outlet.

19. The exhaust gas aftertreatment system of claim 15,
wherein the outlet is to receive the flow of the exhaust from the outlet chamber via the plurality of perforations of the outlet,
wherein the outlet is to facilitate attenuating sound associated with the exhaust gas flowing through the outlet.

20. The exhaust gas aftertreatment system of claim 15,
wherein the outlet is to receive the flow of the exhaust from the outlet chamber via the plurality of perforations of the outlet,
wherein the outlet is to facilitate the flow of the exhaust gas around debris in the outlet.

* * * * *